No. 823,186. PATENTED JUNE 12, 1906.
M. L. MOWRER.
MACHINE FOR HULLING, DEGERMINATING, AND HOMINYING CORN.
APPLICATION FILED NOV. 23, 1905.
2 SHEETS—SHEET 1.
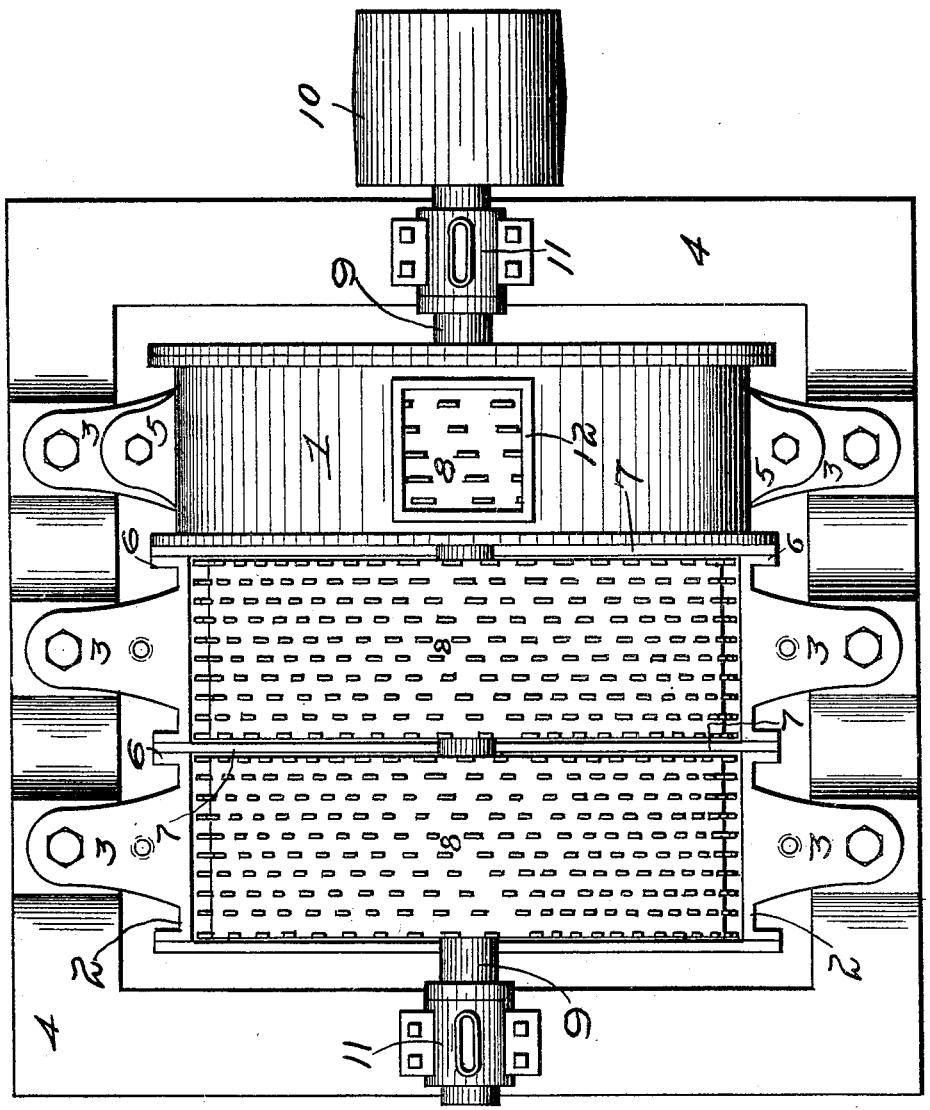

No. 823,186. PATENTED JUNE 12, 1906.
M. L. MOWRER.
MACHINE FOR HULLING, DEGERMINATING, AND HOMINYING CORN.
APPLICATION FILED NOV. 23, 1905.
2 SHEETS—SHEET 2
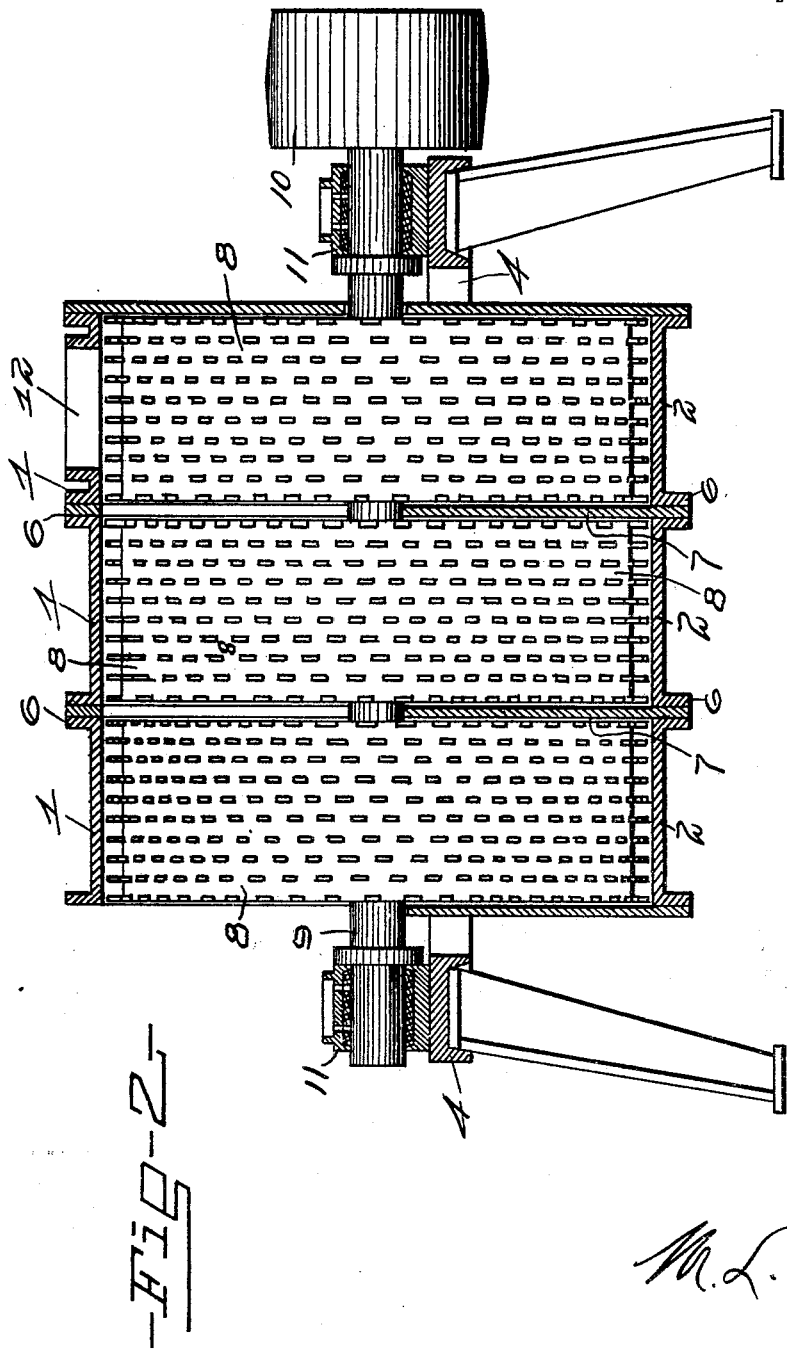
Fig-2-

UNITED STATES PATENT OFFICE.

MARTIN L. MOWRER, OF DAYTON, OHIO.

MACHINE FOR HULLING, DEGERMINATING, AND HOMINYING CORN.

No. 823,186.  Specification of Letters Patent.  Patented June 12, 1906.

Application filed November 23, 1905. Serial No. 288,659.

*To all whom it may concern:*

Be it known that I, MARTIN L. MOWRER, a citizen of the United States, residing at Dayton, in the county of Montgomery and State of Ohio, have invented certain new and useful Improvements in Machines for Hulling, Degerminating, and Hominying Corn; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a machine for hulling, degerminating, and hominying corn, and possesses the new and useful features hereinafter described and claimed.

The object of the invention is to produce a machine which in handling the corn or operating upon the corn will preserve the germs in larger particles—in other words, will not disintegrate the germs to an undesirable extent, but, on the contrary, will enable them to discharge from the machine in large parts.

A further object of the invention is to provide a machine of the above type which is free from clogging and which therefore may be run with a minimum amount of resistance, thus reducing the power necessary to operate the same; and a further object of the invention is to provide a machine which is uniform in its action upon the grain while passing through the machine.

Preceding a more detailed description of the invention reference is made to the accompanying drawings, of which—

Figure 1 is a top plan view with the upper portions of two of the casings removed. Fig. 2 is a vertical sectional elevation through the machine and bearings.

In a detail description of the invention, similar reference characters indicate corresponding parts.

The machine comprises a multiplicity of cylindrical casings, each of which consists of upper and lower parts 1 and 2, which are united in a manner presently described. The lower portion of each of said casings has feet 3, which are bolted or otherwise rigidly attached to a base 4. The upper half of each of said casings is provided with feet or extensions 5, which are secured in a similar manner to the feet or projections 3 of the lower sections. The casings are of uniform diameters and are arranged side by side and communicate one with the other above the axes of said casings. The lower portion of each of these casings is separated from the lower portion of the adjacent casing by a wall 7, thus obstructing the communication from one casing to the other below the axes of said casings; but the upper portions of said casings, as before stated, communicate one with the other in order that the grain while being acted upon may pass from one end of the series of casings to the other end. Fig. 2 shows this communicating feature between the several casings.

8 designates a corresponding number of toothed hulling-cylinders which are rigidly mounted upon shaft 9, said shaft being operated by any suitable power transmitted to pulley 10. This shaft has suitable bearings 11. The teeth of these cylinders 8 project in proximity to the interior side of the casing, the space between the ends of the teeth and the interior sides of the casings being about equal to the thickness of a grain of corn. In operation these cylinders are driven at a uniformly high rate of speed, and the centrifugal force thus developed is instrumental in forcing or driving the grain from one cylinder to the other until it is discharged from the discharge end of the machine. The resistance offered by the grain to the revolving cylinders is, as before stated, reduced to a minimum owing to the series of cylinders being of uniform diameters. The grain is fed to the machine through a feed-opening 12 at one end of the machine—for example, the end of the machine where the power is introduced. The effect of the operation is that the teeth come in contact with the surface of the corn only a sufficient extent to remove the hull and not crush the entire grain. In thus striking the corn the hull is broken, leaving the germ or core of the grain practically intact. It will be observed that the peripheral teeth of the cylinders are arranged spirally in order that the grain may be subjected to lateral or sidewise force which drives the same from one cylinder to the other and out at the discharge end. It will be understood, however, that this spiral arrangement of the teeth need not necessarily be identically the same as shown in the drawings; but some such spiral arrangement is necessary to give the lateral movement to the grain, as before stated, as the grain or corn is fed into the machine through the opening 12 at the head of the machine. After being acted upon by the cylinders throughout the length of the machine the grain is discharged from the machine. The outlet for the grain above referred to is through the upper half of the cylinder at the discharge end of the machine.

Having described my invention, I claim—

1. In a machine of the type specified, a series of sectional cylindrical casings arranged side by side with partitions obstructing communication between said casings below the axes thereof, in combination with a series of hulling-cylinders revoluble within said casings and discharging the grain from one casing to the other above the axes of said casings, and from one end to the other end of said series of casings, substantially as set forth.

2. In a machine of the type specified, a plurality of cylindrical casings of uniform diameters arranged side by side and united, the lower portions of said casings being separated by division-walls, and the upper portions communicating, in combination with a plurality of toothed cylinders, one of which revolves in each casing, and whereby the grain which is fed to the machine at one end thereof, is subjected to uniform action by the cylinders and is discharged at the other end of the machine, substantially as set forth.

3. In a machine of the type specified, a plurality of uniform toothed cylinders subjected to a common rotary movement, a plurality of casings, one of which incloses a single cylinder, said casings being separated below the axes of the cylinders by partitions, and communicating one with the other above the axes of the cylinders, substantially as set forth.

In testimony whereof I affix my signature in presence of two witnesses.

MARTIN L. MOWRER.

Witnesses:
R. J. McCARTY,
CAROLYN M. THEOBALD.